United States Patent
Pirani et al.

(10) Patent No.: US 9,256,882 B2
(45) Date of Patent: Feb. 9, 2016

(54) METHODS, COMMUNICATIONS DEVICES, AND COMPUTER PROGRAM PRODUCTS FOR SELECTING AN ADVERTISEMENT TO INITIATE DEVICE-TO-DEVICE COMMUNICATIONS

(75) Inventors: Akbar Pirani, Marietta, GA (US); Michael Branam, Lawrenceville, GA (US); Bill Brown, Woodstock, GA (US)

(73) Assignee: AT&T INTELLECTUAL PROPERTY I, LP., Atlanta, GA (US)

( * ) Notice: Subject to any disclaimer, the term of this patent is extended or adjusted under 35 U.S.C. 154(b) by 1870 days.

(21) Appl. No.: 12/127,492

(22) Filed: May 27, 2008

(65) Prior Publication Data

US 2009/0296686 A1    Dec. 3, 2009

(51) Int. Cl.

| | |
|---|---|
| H04L 12/66 | (2006.01) |
| H04W 4/00 | (2009.01) |
| G06Q 30/02 | (2012.01) |
| H04M 7/00 | (2006.01) |
| H04N 21/443 | (2011.01) |
| H04N 21/4722 | (2011.01) |
| H04N 21/478 | (2011.01) |
| H04N 21/61 | (2011.01) |
| H04N 21/643 | (2011.01) |
| H04N 21/81 | (2011.01) |
| H04L 29/08 | (2006.01) |

(52) U.S. Cl.
CPC .............. *G06Q 30/02* (2013.01); *H04L 67/02* (2013.01); *H04M 7/003* (2013.01); *H04N 21/443* (2013.01); *H04N 21/4722* (2013.01); *H04N 21/47815* (2013.01); *H04N 21/6125* (2013.01); *H04N 21/6175* (2013.01); *H04N 21/64322* (2013.01); *H04N 21/812* (2013.01)

(58) Field of Classification Search
CPC .............. G06Q 30/02; G06Q 30/0277; G07F 17/0014; G07F 17/16; H04M 15/00; H04M 15/08; H04N 21/4622; H04L 12/66; H04W 4/14

See application file for complete search history.

(56) References Cited

U.S. PATENT DOCUMENTS

| | | | |
|---|---|---|---|
| 7,272,637 B1 | 9/2007 | Himmelstein | |
| 7,313,617 B2 | 12/2007 | Malik et al. | |
| 7,376,129 B2 | 5/2008 | Acharya et al. | |
| 8,401,163 B1 * | 3/2013 | Kirchhoff et al. | 379/201.01 |
| 2003/0014754 A1 * | 1/2003 | Chang | 725/60 |
| 2005/0038699 A1 * | 2/2005 | Lillibridge et al. | 705/14 |
| 2007/0094073 A1 * | 4/2007 | Dhawan et al. | 705/14 |
| 2007/0124207 A1 * | 5/2007 | Faber et al. | 705/14 |
| 2008/0248819 A1 * | 10/2008 | Smith et al. | 455/466 |
| 2008/0288337 A1 * | 11/2008 | Snyder et al. | 705/14 |
| 2009/0016507 A1 * | 1/2009 | Altberg et al. | 379/114.01 |

* cited by examiner

*Primary Examiner* — Melanie Jagannathan
(74) *Attorney, Agent, or Firm* — Cantor Colburn LLP

(57) ABSTRACT

Methods, communications devices, and computer program products for selecting an advertisement to initiate communications between communication devices using an Internet protocol enabled television infrastructure are provided. Input of a call back number is received. Advertisement data of an enterprise is accessed via an Internet protocol enabled device. A selection is received to initiate a communication to the enterprise. A selection of the call back number is received. The call back number is contacted, in response to an indication that the enterprise has been contacted for initiation of the communication.

17 Claims, 5 Drawing Sheets

METHODS, COMMUNICATIONS DEVICES, AND COMPUTER PROGRAM PRODUCTS FOR SELECTING AN ADVERTISEMENT TO INITIATE DEVICE-TO-DEVICE COMMUNICATIONS

CROSS-REFERENCE TO RELATED APPLICATIONS

This application contains subject matter which is related to the subject matter of the following co-pending application(s), each of which is assigned to the same assignee as this application. Each of the below listed applications is hereby incorporated herein by reference in its entirety: application Ser. No. 11/780,746 entitled "Systems, Methods and Computer Products for Placing Telephone Calls via Internet Protocol Television Call Logs", filed Jul. 20, 2007.

BACKGROUND

Exemplary embodiments relate to the field of network communication transmissions, and particularly to the field of network communication transmissions within networks that support Internet protocol television services.

Internet protocol television (IPTV) service is a digital television delivery service in which the digital television signal is delivered to users via a computer network infrastructure using the Internet Protocol. Typically, IPTV services are bundled with additional Internet services, such as Internet web access and voice over Internet protocol (VoIP). Subscribers and users of subscriber devices receive IPTV services via a computing device, such as a set top box, that is connected to a television or display device for the reception of a digital signal. Used in conjunction with an IP-based platform, the set top box allows for a subscriber or other user to access IPTV services and any additional services that are integrated within the IPTV service.

IPTV service platforms allow for an increase in the interactive services that can be provided to residential subscribers/users. As such, a subscriber/user can have access to a wide variety of content that is available via the IPTV service or the Internet. The IPTV infrastructure also allows the delivery of a variety of video content instantly to the subscribers/users.

It is desirable to provide access to various services, and particularly to provide access to various services using an IPTV infrastructure. Also, it would be desirable to have techniques for conveniently contacting an enterprise after viewing an advertisement using an IPTV infrastructure.

BRIEF SUMMARY

Exemplary embodiments include a method for selecting an advertisement to initiate communications between communication devices using an Internet protocol enabled television infrastructure. Input of a call back number is received. Advertisement data of an enterprise is accessed via an Internet protocol enabled device. A selection is received to initiate a communication to the enterprise. A selection of the call back number is received. The call back number is contacted, in response to an indication that the enterprise has been contacted for initiation of the communication.

Additional exemplary embodiments include a communications device. Memory stores a program for selecting an advertisement to initiate communications. A processor is functionally coupled to the memory and the processor is responsive to computer-executable instructions contained in the program. In response to an indication that the enterprise has been contacted for initiation of the communication, the processor is operative to receive input of a call back number, to access advertisement data of an enterprise, to receive a selection to initiate a communication to the enterprise, to receive a selection of the call back number, and to contact the call back number.

Further exemplary embodiments include a computer program product, tangibly embodied on a computer readable medium, for selecting an advertisement to initiate communications. The computer program product includes instructions for causing a computer to execute the method above.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains exemplary embodiments, together with advantages and features, by way of example with reference to the drawings.

DETAILED DESCRIPTION OF EXEMPLARY EMBODIMENTS

Figure 1:
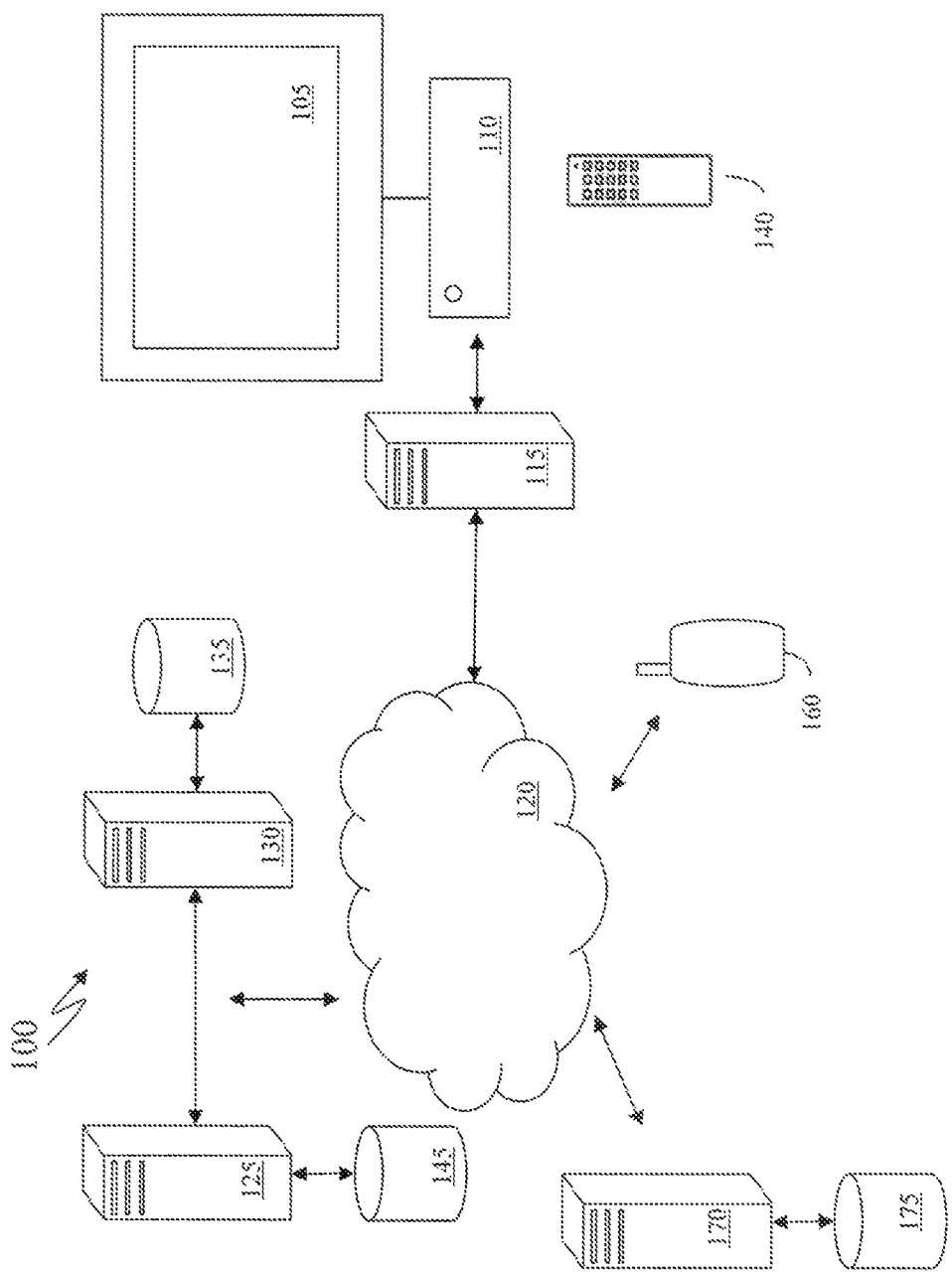
FIG. 1 illustrates a block diagram of a system in accordance with exemplary embodiments.

FIG. 1 illustrates a block diagram of a system 100 in accordance with exemplary embodiments. The system 100 provides an infrastructure through which users can access media (including video, audio, data, multimedia messaging, waypoints, or any other type of media) through a communications device 105, such as an IPTV enabled television and a computing device 110, such as a set top box, configuration or any other type communication device. Although shown as separate devices, the communications device 105 and the set top box 110 may be integrated into one device. As an IPTV network, the system 100 also includes a remote controller 140 for inputting information and controlling the communications device 105 (e.g., a television). It is understood that in exemplary embodiments and implementations, communications device 105 can be a variety of other communications devices such as general purpose or laptop computers, wireless devices such as cellular telephones, portable computing devices, digital music players (e.g., MP3 players), mobile devices, and digital televisions. In addition, a wireline public switched telephone network (PSTN) telephone, session initiation protocol (SIP) telephone, dual-mode mobile telephone, personal digital assistant (PDA), or other type of communications device may be included in the system 100 of FIG. 1.

According to exemplary embodiments, the system 100 includes the communications device 105 as discussed above, which can be an IP enabled television communicatively coupled to the set top box 110, which in turn may be communicatively coupled to a server 115 for accessing a network 120 such as but not limited to the Internet. It is understood that the server 115 (e.g., a residential gateway) may be omitted and the communications device 105 may directly access the network 120. Furthermore, residential gateways, such as a DSL modem, may be used to access the network 120. Indeed, access to the network 120 is not meant to be limited in any way. The network 120 may include circuit-switched and/or packet-switched technologies and devices, such as routers, switches, hubs, gateways, etc., for facilitating communications between the communications device 105 and servers 125, 130, 170. The network 120 may include wireline and/or wireless components utilizing, e.g., IEEE 802.11 standards for providing over-the-air transmissions of communications. The network 120 can be IP-based networks for communication between a customer service center and clients/users using the communication device 105 via a broadband connection.

Also, the network 120 may include wireline and/or wireless components utilizing standards for, e.g., multimedia messaging services (MMS). The network 120 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals (e.g., 160), supporting a wide range of standard interfaces.

According to exemplary embodiments, the network 120 facilitates transmission of media (e.g., images, video, data, multimedia messaging, and any other types of media) from content services provider systems to customers/users via devices, such as the communications device 105, through a broadband connection.

In exemplary embodiments, the network 120 can be a managed IP network administered by a service provider, which can control bandwidth and quality of service for the communications discussed herein. The network 120 may be implemented in a wireless fashion, e.g., using wireless protocols and technologies, such as WiFi, WiMax, and BLUETOOTH. The network 120 can also be a packet-switched network, such as a local area network, a wide area network, a metropolitan area network, an Internet network, or other similar types of networks. The network 120 may be a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, and a wireless access point.

The system 100 can manage multiple accounts as established by particular users (e.g., by using the server 125). These accounts may then be used to provide access to media services as described further herein.

As further shown in FIG. 1, the server 125 (e.g., a host server) may be in communication with the server 130 (e.g., an authentication server) and the communications device 105 via the network 120. The server 125 (such as a media server, back-end server, or networked address book server) may be implemented using a high-speed processing device (e.g., a computer system) that is capable of handling high volume activities conducted via the communications device 105 and other network entities. According to exemplary embodiments, the server 130 may receive requests from the communications device 105 to access network services (e.g., to access a webpage). The server 125 may be implemented by a network service provider, a content service provider, a media service provider, an MMC, a webpage provider, a networked address book provider, or another enterprise. Similarly, the server 130 may be implemented using a high-speed processing device (e.g., a computer system) that is capable of handling high volume activities conducted via the communications device 105, and other network entities via the network 120. As a non-limiting example, the server 130 (e.g., as an authentication server) may receive requests from the communications device 105 either to establish a media services account or to access network services (e.g., to access media). As an authentication server, the server 130 may implement authentication software for restricting or controlling access to network services provided by the server 125 (or another server). The server 130 may be in communication with a customer identity system (CIS) database (such as a storage device 135), which stores user credentials (e.g., user names and passwords). In another exemplary embodiment, user credentials can be stored on the communications device 105.

In exemplary embodiments, the user can establish an account using devices associated with the user. For example, the communications device 105 can enable the establishment of an account that is managed by the provider enterprise of the server 125. As such, the communications device 105 may receive Internet services from the provider enterprise of the server 125, and an account record may be generated for the user of the communications device 105 that identifies the user and the account for which the services are provided. Account information and records may be stored in a storage device accessible by the server 125, such as a storage device 145.

Furthermore, exemplary embodiments are not limited to but are capable of being implemented in the system 100 illustrated in FIG. 1. Additionally, the servers 115, 125, 130, and 170 may be representative of numerous servers. The storages devices 135 and 145 and a storage device 175 may be representative of numerous storages devices. Likewise, the network 120 may be representative of numerous networks. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

Figure 2:
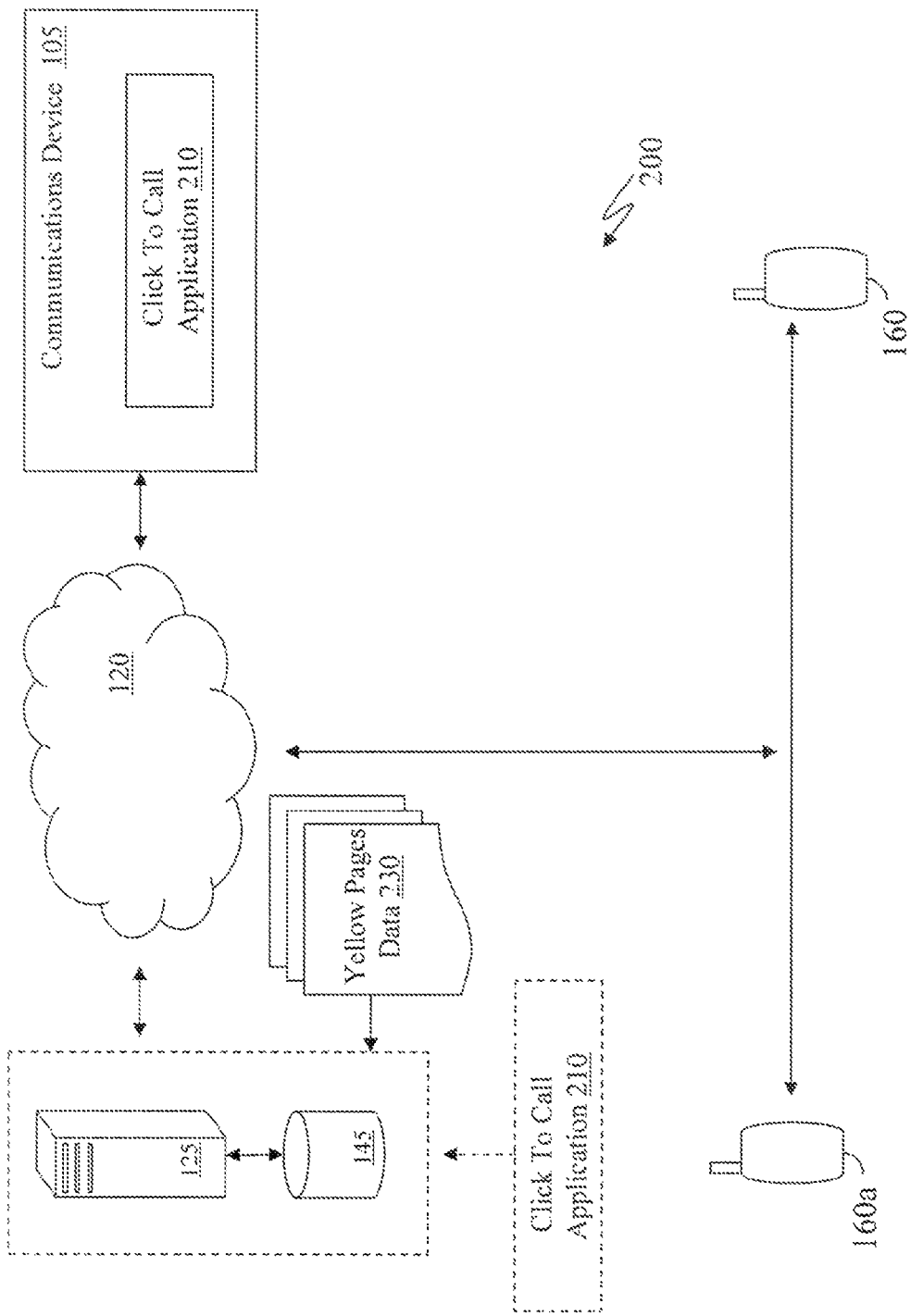
FIG. 2 illustrates a block diagram of a system for selecting an advertisement to initiate device-to-device communication in accordance with exemplary embodiments.

FIG. 2 illustrates a block diagram of a system 200 for selecting an advertisement to initiate device-to-device communication in accordance with exemplary embodiments. In an exemplary embodiment, a user may utilize the communications device 105 to view an advertisement by communicating with a server, such as the server 125 coupled to the storage device 145.

Figure 3:
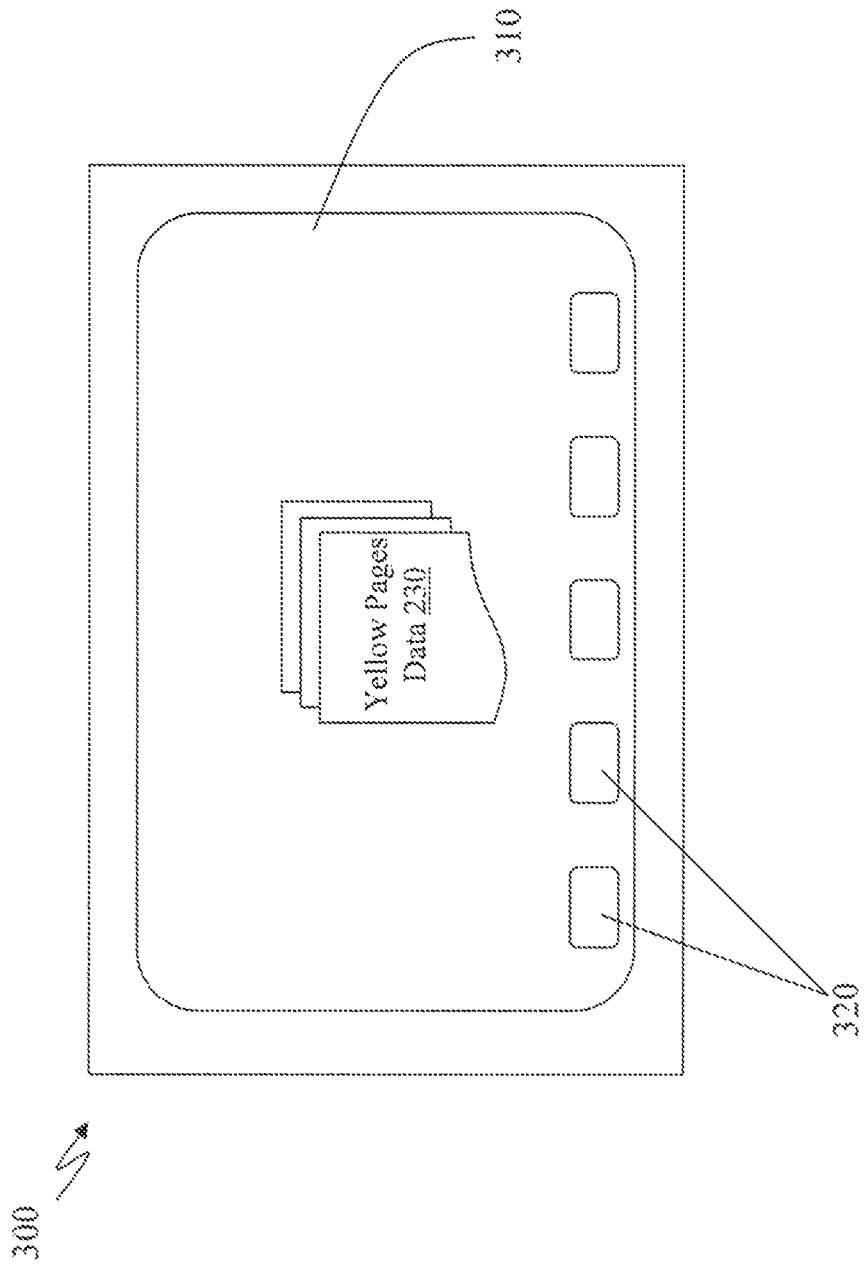
FIG. 3 illustrates a non-limiting example of a screen which may depict advertisements in accordance with exemplary embodiments.

As a non-limiting example, FIG. 3 illustrates a screen 300 which may depict advertisements in accordance with exemplary embodiments. In exemplary embodiments, an advertisement screen 310 (e.g., on the communications device 105) may illustrate advertisements of enterprises, e.g., in the YELLOW PAGES™ or the WHITE PAGES™. YELLOW PAGES™ data 230 of a particular enterprise may be viewed on the advertisement screen 310. The advertisement screen 310 may have various buttons 320. One of the buttons 320 may be a click to call button. The user may select the click to call button to initiate a call to the particular enterprise on the advertisement screen 310, which may be a business or person in the YELLOW PAGES™. Alternatively and/or additionally, in exemplary embodiments, the click to call button may or may not be located on the advertisement screen 310 but may be located on a separate screen of the communications device 105 (e.g., a television), and the user may select the click to call button of the communications device 105.

Referring to FIG. 2, in exemplary embodiments, a click to call application 210 may parse the YELLOW PAGES™ data 230 to locate a telephone number that corresponds to the particular entity. The click to call application 210 may retrieve the located telephone number from the YELLOW PAGES™ data 230 and place a call to the located telephone number.

In exemplary embodiments, the user may input (e.g., using the remote controller 140) a variety of numbers in advance in the click to call application 210 (which may reside on the communication device 105, the server 125, and/or the set top box 110), and the user may label the numbers, e.g., wife cell phone, husband cell phone, child cell phone, home phone, etc. Each of these numbers can be stored in advance (e.g., as part of preferences data in a database of the communications device 105, the set top box 110, the server 130, and/or any network element) and used later by the user. These numbers may be considered call back or ring back numbers in exemplary embodiments.

In response to selecting the click to call button of the buttons 320, the click to call application 210 provides the user with the list of stored, various phone numbers to choose from. The user may, e.g., select the husband cell phone. The click to call application 210 retrieves the telephone number of the business from the advertisement screen 310 (e.g., from the YELLOW PAGES™ data 230). The click to call application 210 initiates a phone call to the business (enterprise or entity) displayed in the advertisement screen 310. The click to call application 210 rings back the number labeled as husband cell phone when the call placed to the business rings. The user may pick up (i.e., turn on) the husband cell phone and talk to a representative of the business.

As a non-limiting example, the click to call button may be selected to call a telephone 160a, which represents the telephone number of the business displayed on the advertisement screen 310. When the telephone 160a rings, the click to call application 210 rings back the mobile device 160 (which may be the telephone with the ring back number selected by the user). The user may turn on the mobile device 160 and talk to the person on the telephone 160a. While telephones are given as examples of the devices 160 and 160a, it should be appreciated that these devices may be any communication devices capable of being operated in the manner described herein. In exemplary embodiments, the call may be between PDAs, computers, videophones, videogames, or any other communication devices. Also, the term business is not meant to be limiting, and the calls may be to any entity, person, or enterprise capable of being contacted.

In exemplary embodiments, there are many ways to place a phone call to an enterprise. As non-limiting examples, voice over Internet protocol (VoIP) may be used by the click to call application 210 to call the enterprise, or the PSTN may be used to place a phone call to the enterprise. As a non-limiting example, the click to call application 210 may connect with a voice bridging system (or voice conferencing enterprise) to place the call to the enterprise and to ring back to the user. Also, software for placing calls may be stored on the communications device 105 or the set top box 110. Moreover, it is contemplated that any suitable technique in the art may be used for placing phone calls, and examples discussed herein are not meant to be limiting in any manner.

Figure 4:
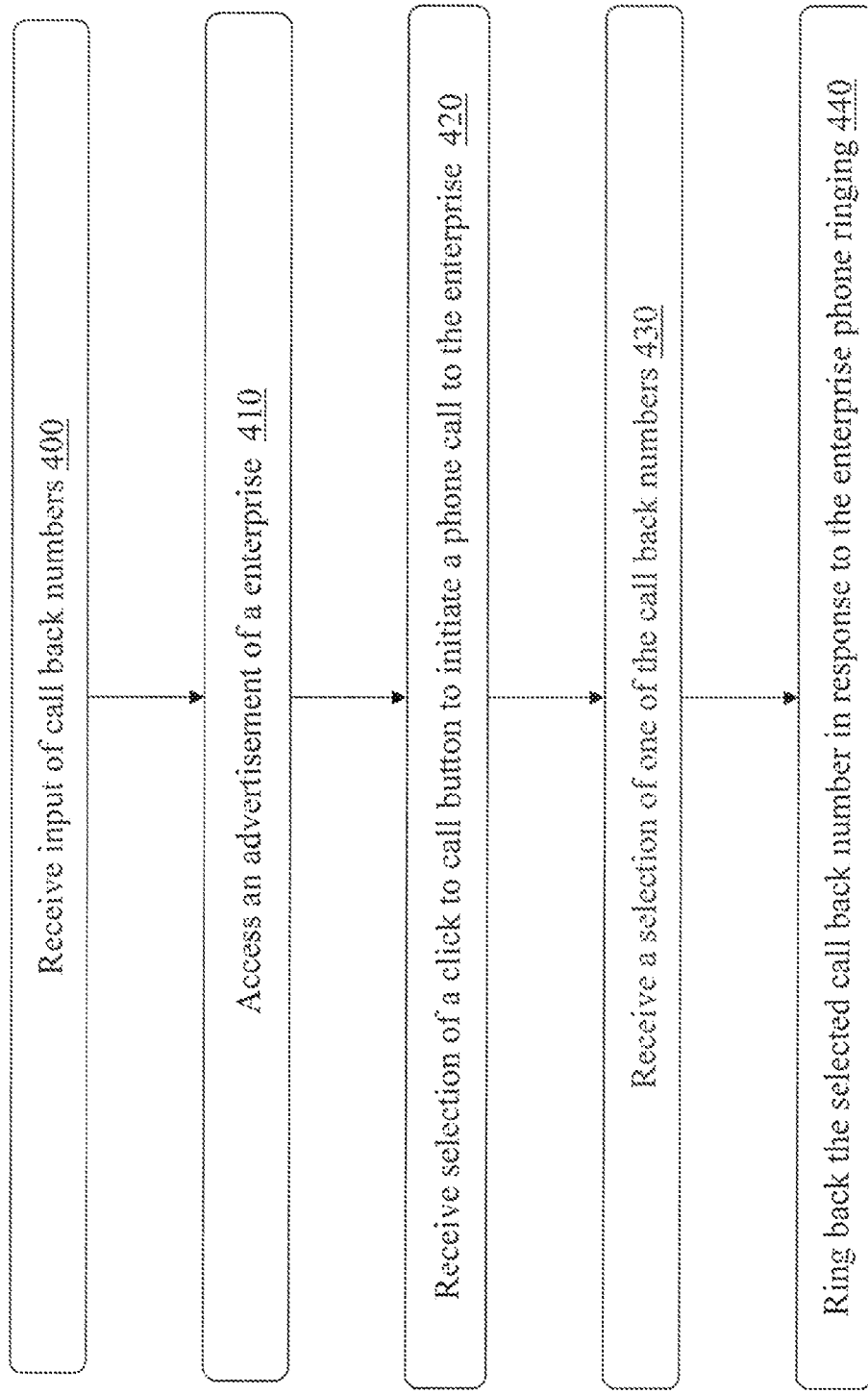
FIG. 4 illustrates a method for selecting an advertisement to initiate device-to-device communication in accordance with exemplary embodiments.

FIG. 4 illustrates an example of a method for selecting an advertisement to initiate phone-to-phone communication in accordance with exemplary embodiments. The advertisement may be displayed on the communications device 105.

In accordance with exemplary embodiments, multiple telephone numbers (e.g., call back numbers) may be received and stored in advance, e.g., using the click to call application 210 at 400. As a non-limiting example, a user may utilize the remote controller 140 (in FIG. 1) to input various telephone numbers to be used as call back numbers, and the call back numbers may be stored on the set top box 110, the communications device 105, and/or a network entity. The communications device 105 may be used to access an advertisement of an enterprise displayed in the advertisement screen 310 at 410. A click to call button of the buttons 320 may be selected to initiate a phone call to the enterprise telephone 160a by utilizing, e.g., the click to call application 210 at 420. One of the call back numbers may be selected to ring back at 430. As a non-limiting example, the call back number named husband cell phone may be selected as the call back number. In response to the enterprise telephone 160a ringing, the click to call application 210 rings back the telephone 160 (e.g., corresponding to husband cell phone) of the user at 440. The user may effectively communicate on the telephone 160 with the representative of the enterprise on the telephone 160a.

Figure 5:
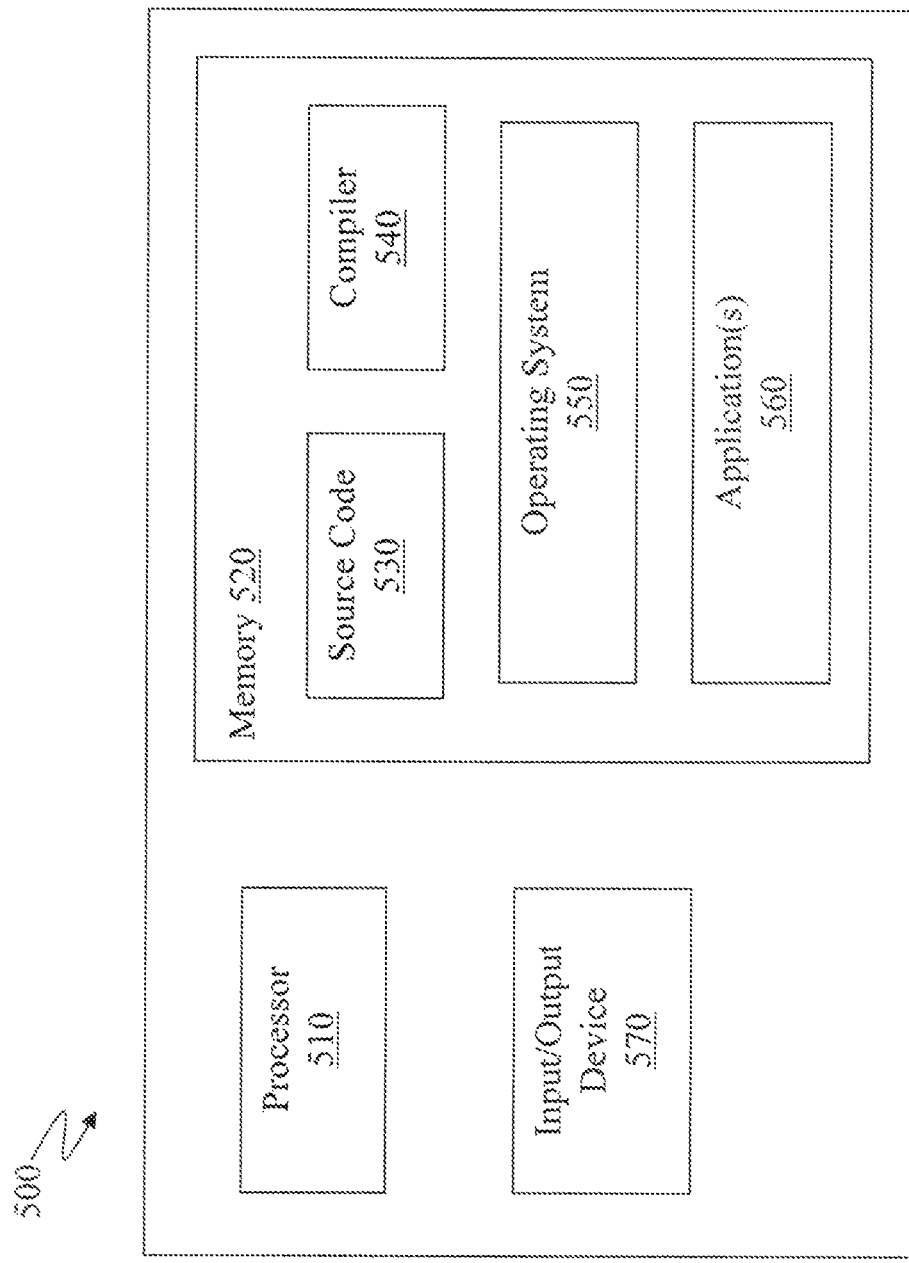
FIG. 5 illustrates an example of a computer having capabilities that may be included in exemplary embodiments.

FIG. 5 illustrates an example of a computer 500 having capabilities, which may be included in exemplary embodiments. Various methods and systems discussed above may also utilize the capabilities of the computer 500. One or more of the capabilities of the computer 500 may be incorporated in the communications device 105, the set top box 110, the servers 115, 125, 130, 170, and/or any element discussed herein.

The computer 500 includes, but is not limited to, PCs, workstations, laptops, PDAs, palm devices, Internet protocol enabled televisions, set top boxes, servers, and the like. Generally, in terms of hardware architecture, the computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and an application 560 (which may be one or more applications) of the exemplary embodiments. As illustrated, the application 560 comprises numerous functional components for implementing the features and operations of the exemplary embodiments. The application 560 of the computer 500 may represent the various applications referred to herein, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments is applicable on all other commercially available operating systems.

The application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, NET, and the like.

The I/O devices 570 may include input devices such as, for example but not limited to, a mouse, keyboard, scanner, microphone, camera, etc. Furthermore, the I/O devices 570 may also include output devices, for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such at the Internet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices and systems discussed herein, and it is understood that additional software and hardware components may be included in the various devices and systems discussed in exemplary embodiments.

Communication devices, networks, systems, Internet devices, PCs, PDAs, mobile devices, servers, set top boxes, etc., comprise all the hardware, software, modules, applications, and interfaces necessary to operate and function as described herein.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for selecting an advertisement to initiate communications between communication devices using an Internet Protocol-enabled infrastructure, the method comprising:
   receiving, by an Internet Protocol-enabled media device, input of a call back number associated with a subscriber;
   accessing, by the Internet Protocol-enabled media device, advertisement data of an enterprise, the advertisement data of the enterprise presented on a display screen of the Internet Protocol-enabled device;
   receiving, by the Internet Protocol-enabled media device, a selection to initiate a communication to the enterprise;
   parsing through the advertisement data, by the Internet Protocol-enabled media device in response to the selection, to extract a telephone number of the enterprise;
   receiving, from the Internet Protocol-enabled media device, a selection of the call back number;
   wherein the Internet Protocol-enabled media device stores a calling application;
   storing, by the calling application of the Internet Protocol-enabled media device, a plurality of call back numbers associated with the subscriber in the Internet Protocol-enabled media device including the call back number associated with the subscriber, wherein the call back number associated with the subscriber is to reach the subscriber by ringing back to the subscriber; and
   calling, by the calling application of the Internet Protocol-enabled media device, the telephone number corresponding to the enterprise and the call back number stored in the Internet Protocol-enabled media device;
   wherein the call back number is called by the calling application of the Internet Protocol-enabled media device, in response to an indication that the enterprise has been contacted for initiation of the communication.

2. The method of claim 1, wherein a click to call button of the Internet Protocol-enabled media device is selected to initiate a telephone call to the enterprise;
wherein software for placing calls, to the call back number associated with the subscriber, is stored in the Internet Protocol-enabled media device.

3. The method of claim 1, wherein the calling application stored on the Internet Protocol-enabled media device receives the input of the call back number to store the call back number.

4. The method of claim 1, wherein the calling application stored on the Internet Protocol-enabled media device places a telephone call via a voice over internet protocol infrastructure.

5. The method of claim 1, wherein the calling application stored on the Internet Protocol-enabled media device places a telephone call via a public switched telephone network.

6. The method of claim 1, wherein the calling application stored on the Internet Protocol-enabled media device places a telephone call via a voice conferencing enterprise.

7. The method of claim 1, wherein the advertisement data is retrieved from an information page.

8. The method of claim 1, wherein a click to call button of an information page is selected to initiate the telephone call to the enterprise.

9. The method of claim 1, wherein the calling application connects to a bridging system to place the call to the enterprise and call back the subscriber.

10. An Internet Protocol-enabled media device, comprising:
   memory storing a program for selecting an advertisement to initiate communications; and
   a processor, functionally coupled to the memory, the processor being responsive to computer-executable instructions contained in the program and operative to:
   receive input of a call back number associated with the subscriber;
   access advertisement data of an enterprise, the advertisement data of the enterprise presented on a display screen of the Internet Protocol-enabled media device;
   receive a selection to initiate a communication to the enterprise;
   parse through the advertisement data, by the processor in response to the selection, to extract a telephone number of the enterprise;
   receive a selection of the call back number;
   wherein the program comprises a calling application;
   store, via the calling application, a plurality of call back numbers associated with the subscriber in the memory of the Internet Protocol-enabled media device including the call back number associated with the subscriber, wherein the call back number associated with the subscriber is to reach the subscriber by ringing back to the subscriber; and
   call, via the calling application, the telephone number corresponding to the enterprise and the call back number stored in the memory;
   wherein the call back number is called, in response to an indication that the enterprise has been contacted for initiation of the communication.

11. The Internet Protocol-enabled media device of claim 10, wherein a click to call button of the program is selected to initiate a telephone call to the enterprise.

12. The Internet Protocol-enabled media device of claim 10, wherein the program receives the input of the call back number and the program stores the call back number in the memory.

13. A computer program product, tangibly embodied on a non-transitory computer readable medium, for selecting an advertisement to initiate communications between communication devices using an internet protocol enabled infrastructure, the computer program product including instructions for causing an Internet Protocol-enabled media device to execute a method, comprising:

receiving, by the Internet Protocol-enabled media device, input of a call back number associated with the subscriber;

accessing, by the Internet Protocol-enabled media device, advertisement data of an enterprise via the internet protocol enabled infrastructure, the advertisement data of the enterprise presented on display screen of the Internet Protocol-enabled media device;

receiving, by the Internet Protocol-enabled media device, a selection to initiate a communication to the enterprise;

parsing through the advertisement data in response to the selection, to extract a telephone number of the enterprise;

receiving a selection of the call back number;

wherein the Internet Protocol-enabled media device stores a calling application;

storing, by the calling application of the Internet Protocol-enabled media device, a plurality of call back numbers associated with the subscriber in a memory of the Internet Protocol-enabled media device including the call back number associated with the subscriber, wherein the call back number associated with the subscriber is to reach the subscriber by ringing back to the subscriber; and calling, by the calling application of the Internet Protocol-enabled media device, the telephone number corresponding to the enterprise and the call back number stored in the memory;

wherein the call back number is called, in response to an indication that the enterprise has been contacted for initiation of the communication.

14. The computer program product of claim 13, wherein a click to call button of the Internet Protocol-enabled media device is selected to initiate a telephone call to the enterprise.

15. The computer program product of claim 13, wherein the telephone call is placed to the enterprise via a public switched telephone network.

16. The computer program product of claim 13, wherein the advertisement data is retrieved from an information page.

17. The computer program product of claim 13, wherein a click to call button of an information page is selected to initiate the telephone call to the enterprise.

* * * * *